Dec. 24, 1968   C. ASMANES   3,418,027
ROTARY TABLE
Filed July 15, 1966

INVENTOR.
Charles Asmanes
BY.

ATTORNEY.

United States Patent Office 3,418,027
Patented Dec. 24, 1968

3,418,027
ROTARY TABLE
Charles Asmanes, Oak Ridge, Tenn., assignor to the United States of America as represented by the United States Atomic Energy Commission
Filed July 15, 1966, Ser. No. 565,494
2 Claims. (Cl. 308—70)

ABSTRACT OF THE DISCLOSURE

Rotary tables are provided with a bearing system which assures that rotation of the table about its central axis is established and retained during continuous use of the table even though the latter is subjected to unequal or excessive loadings. The bearing system utilizes a polytetrafluorethylene bushing to provide the bearing surface with the bushing being stressed sufficiently to take on an isostatic property which causes the bushing to uniformly contact the contiguous surface of a centrally disposed shaft projecting from the table.

---

The invention described herein was made in the course of, or under, a contract with the U.S. Atomic Energy Commission. This invention relates generally to bearing supported rotatable structures, and more particularly to rotary tables incorporating resilient bearing means for minimizing runout about a central rotational axis and for preventing the occurrence of permanent sets in bearing means when the rotary table is subjected to excessive or non-uniform loadings.

Rotary tables are frequently employed in various machining systems, e.g., vertical boring mills, lathes, grinders, etc., wherein precision is of major importance. Thus, in order to achieve this precision it is necessary for the central axis about which the table rotates to remain virtually fixed; i.e., the table should exhibit only negligible rotational runout (radial displacement) during rotation about the central axis. Also, the table should be uniformly supported about its marginal surfaces to assure that the rotational plane of the table remains virtually constant for preventing undue strain upon the bearing means adjacent the axis of rotation and for facilitating the rotation thereof about the central axis.

Normally, rotary tables comprise a base for rotatably supporting a disc-shaped table having a centrally disposed shaft, lug, or boss projecting into a suitable cavity or receptacle in the base for providing a rotational axis for the table. The bearing means, as previously known, that are used intermediate the table and base for affording relative movement therebetween are formed of metal bushings or roller bearings. In the less expensive rotary tables a metal bushing is usually disposed about the table boss to provide a bearing surface between the table base and the boss, while in the more expensive tables a roller bearing arrangement between the table boss and base is utilized. In most of these rotary tables the peripheral regions or marginal surfaces are supported on roller bearings carried by the base, but some of the less expensive tables merely use adjacently disposed smooth surfaces on the base and table for providing the bearing means.

While these previously known bearing means may be satisfactory for many purposes, they suffer several shortcomings or drawbacks which discourage their use or render them incapable of supporting tables for essentially exact rotation about their central axis. For example, since metal bearings such as bushings or roller bearings are essentially rigid, i.e., exhibiting little or no resiliency, they may take a permanent set or deformation when subjected to excessive loadings. This condition becomes significantly serious if the loading is non-uniformly applied to the table since such a loading will likely affect the rotational axis of the table. Further, when the previously known metallic bearings are employed, rotation of the table about its central axis is primarily dependent upon the alignment of the metal table boss in the metal bearings since the bearings are relatively rigid and will not permit permissive error in alignment.

The present invention aims to overcome or substantially minimize the above-mentioned and other shortcomings or drawbacks by providing a novel bearing system for rotary tables whereby rotation of the table about its central axis is readily achieved and maintained during continuous use of the table. Generally, the bearing system of the present invention utilizes a resilient plastic material, namely, "Teflon" (polytetrafluorethylene), that is capable of providing substantially friction-free movement of surfaces in contact therewith without requiring the use of a lubricating medium. The unique bearing system comprises a Teflon bushing intermediate the table boss and the base and an annular Teflon track intermediate the peripheral surfaces of the table and the base. As will be discussed in greater detail below, the Teflon bushing and track are sufficiently resilient to obviate permanent distortions thereof when the table is subjected to unequal or excessive loadings so as to assure that the table maintains or readily returns to its original axis of rotation. Also, when the Teflon bushing is stressed it acquires an isostatic property which enables the table boss to "seek" its own center in the bushing for minimizing or virtually eliminating rotational runout.

An object of the present invention is to provide new and improved bearing means for use in structures incorporating bearing supported rotating elements.

Another object of the present invention is to provide novel bearing means for use in rotary tables whereby operating characteristics common to only the more expensive rotary tables are achieved in a highly economical manner.

Another object of the present invention is to provide rotary tables with novel bearing means of resilient material so as to obviate bearing distortion, table alignment, and other shortcomings suffered by the previously known rotary tables utilizing relatively rigid bearing means.

A further object of the present invention is to provide rotary tables with resilient bearing means of Teflon which provides a novel isostatic coupling between relatively movable elements for assuring that the table achieves and maintains an essentially fixed axis of rotation.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
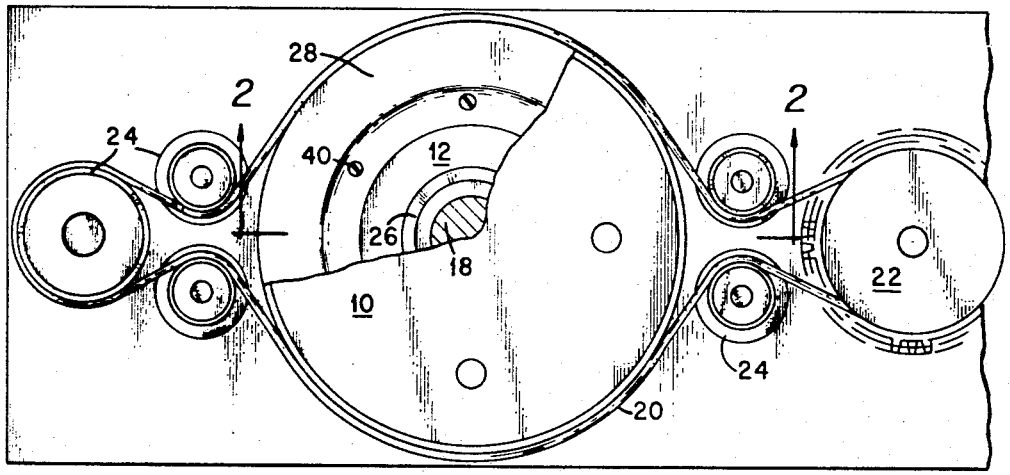
FIG. 1 is a plan view, partly cut away, of a rotary table and associated drive means that may have incorporated therein the novel bearing system of the present invention.
Figure 2:
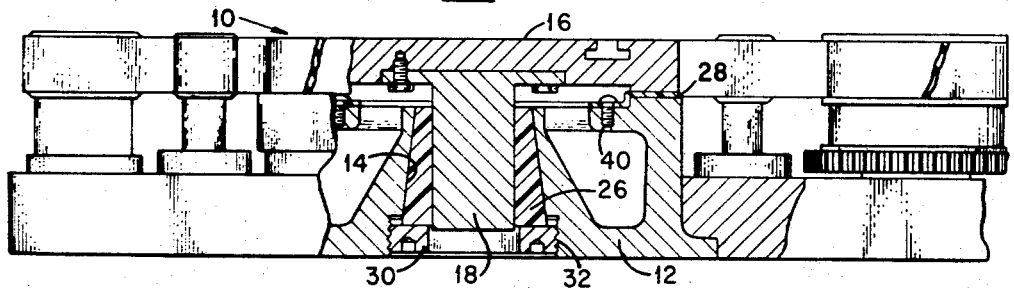
FIG. 2 is an elevational sectional view taken generally along line 2—2 of FIG. 1 showing details of one form of the bearing system of the persent invention.

As shown in FIGS. 1 and 2, the improved rotary table, as generally indicated at 10, may comprise a base 12 having a centrally disposed throughgoing passageway or aperture 14. Supported by and rotatable on the base 12 is a disc-shaped table 16 which includes a centrally disposed metal shaft or boss 18 that projects into the aperture 14 for coupling the table to the base while providing the table with a spindle for defining an axis about which the table rotates. The table 16 may be rotated in any suitable manner, such as, for example, by the belt drive arrangement shown in FIG. 1 which may comprise a belt 20 frictionally engaging peripheral edges of the table and driven by a geared wheel 22. This belt drive may also include several pulleys or wheels 24 which may be selectively adjusted to vary the surface area contact between the belt and table and the force with which the belt bears against the table. Or, if desired, the table 16 may be driven by a suitable geared drive mechanism (not shown).

In order to rotate the table 16 on the base 12 about the axis provided by the boss 18 and aperture 14 in an essentionally frictionless manner, bearing means in the form of a tubulation or bushing 26 and an annular track 28 are respectively disposed between the boss and the base walls defining the aperture and between the base and the underside of the table adjacent peripheral or marginal surfaces thereof. The bushing 26 and track 28 providing the entire bearing surface between the table and base are constructed of a resilient plastic material which is capable of providing a relatively friction-free bearing surface with respect to a moving metal surface abutting thereagainst. A plastic material which has been found to be highly acceptable for use as the bearing material is "Teflon" (polytetrafluorethylene), since this material not only provides a significantly fritcion-free bearing surface requiring no lubrication, but is also virtually inert to machining coolants and other corrosive substances frequently used in connection with the operation of rotary tables. The fact that Teflon does not require lubrication is important when the rotary table is used in a dry or inert atmosphere where the presence of lubricants may be undesirable.

Perhaps even more significantly, the use of Teflon as the bearing material provides a novel mechanism by which a substantial amount of error can be tolerated in aligning the table boss 18 within the base aperture 12 and yet provide an assembly wherein the table assumes and maintains an axis of rotation exhibiting virtually no rotational runout. This novel mechanism is achieved by subjecting the Teflon bushing to an externally applied pressure loading that causes the bushing to acquire an isostatic property which, in turn, causes the bushing 26 to bear against the table boss 18 in such a manner that the force exerted by the bushing against the boss is equally distributed about the entire circumference and enveloped length of the boss. Thus, if the boss 18 is not exactly centered in the bushing 26 during the assembly of the table or if the boss is not perfectly round, a yielding or compensating effect takes place in the bushing when stressed to, in effect, force the boss 18 to "seek" its own center and thereby virtually eliminate rotational runout errors.

In order to provide the rotary table 10 with the novel bushing to obtain the above-mentioned features, the aperture 14 in the base 12 is preferably shaped so as to be in the configuration of truncated conical cavity with the lesser diameter or circumference being in the upper portion of the base adjacent to the table, as shown. The annular bearing or bushing 26 is, in turn, preferably of an elongate configuration with the outer walls thereof being uniformly inclined or tapered so as to be essentially parallel to the base walls defining the aperture. Also, the cross sectional dimensions of the bushing 26 should generally correspond to those of the aperture so that when the bushing is disposed within the aperture the outer or peripheral wall surfaces of the bushing are in an abutting relationship with the walls of the aperture while the uppermost end of the bushing (as shown) terminates at a location in close proximity to the narrowest end of the aperture 14. The inner diameter of the annular bushing is preferably uniform throughout the entire length of the bushing and also slightly larger than the diameter of the boss 18 so that a relatively snug fit occurs when the boss 18 is inserted into the bushing 26.

With the bushing 26 disposed in the aperture 14 and the boss 18 disposed in the bushing 26, the latter may be subjected to a pressure loading to effect the above-described isostatic property for aligning the boss 18 within the bushing 26. This pressure loading is preferably applied against the lower or thicker end of the bushing so that as the bushing is forced upwardly in the aperture it is simultaneously forced radially inwardly by the tapered base walls so as to bear against the boss 18 in a circumferentially uniform manner. The particular angle of the taper given to the walls of the aperture and bushing should be sufficient to both prevent the displacement of the bushing from the aperture and to transfer a substantial portion of the longitudinally applied force in a lateral direction. Satisfactory results have been achieved by using a taper angle of about 5 degrees, but larger angles may be satisfactorily used. Also, to assure that the bushing 26 acquires a satisfactory isostatic property therein when stressed and that the forces relayed thereto by movement of the boss 18 are absorbed by the bushing and not transmitted, it is necessary for the bushing to be relatively massive. For example, in a 16-inch table the bushing 26 may have an over-all length of about 3 inches, an inner diameter of about 2.5 inches, an outer diameter at the narrow end of the bushing of about 3 inches, and an outer diameter at the wide end of the bushing of about 3.5 inches.

To apply the pressure loading against the bushing 26, a relatively simple and uniformly variable force transmitting mechanism as shown in FIG. 2 may be used. This mechanism comprises an externally threaded annular nut 30 which is threadedly received on mating threads 32 projecting from a laterally offset portion of the aperture wall so as to bear against the lowermost end of the bushing 26 with increasing force as the nut is turned inwardly upon the threads 32. In this embodiment the lower end of the bushing terminates short of the lowermost end of the aperture at a location overlapped by the threads 32 to assure that sufficient threads are available for applying the desired amount of force against the bushing 26. By using the annular nut 30, the table boss 18 may project completely through the bushing 26 so as to assure that the contact between the boss 18 and bushing 26 occurs only along the length of the boss 18 and that the pressure loading imposed on the bushing will provide the desired isostatic forces against the bushing. In other words, if the boss 18 terminated short of the lowermost end of the bushing 26 it is likely that a portion of the bushing may be sufficiently deformed radially inwardly during the pressure loading of the bushing so as to underly the end of the boss and thereby impose a condition where the edges of the boss may cut or wear into the bushing and where a sufficient amount of the pressure loading may be dissipated as to render the remaining bushing portion inadequately stressed to provide the desired isostatic property. Also, with the form shown in FIG. 2, the table may be readily removed from the bushing 26 and replaced by another table by merely releasing the restraint against the boss afforded by the stressed bushing 26.

Figure 3:
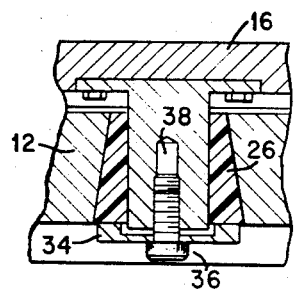
FIG. 3 is a fragmentary sectional view showing a variation of the bearing retaining structure used in the FIG. 2 embodiment.

In FIG. 3, a construction is shown for coupling the table to the base in a more secure manner than that shown in FIG. 2. In this embodiment a generally cup-shaped washer 34 is clamped against the bushing 26 by a bolt 36 which is threadably received in a threaded aperture 38 centrally located in the lower end of the boss 18. The washer 34 is preferably cup-shaped to assure that adequate force may be applied against the bushing 26 by turning the bolt 36 prior to establishing contact between the washer and boss. Inasmuch as the surface area of the bushing contacted by the boss 18 and washer 34 may be as great or greater than the contacted surface area between the bushing and base it may be desirable to roughen the aperture walls or in some other manner inhibit rotation of the bushing for assuring that relative movement between the boss 18 and base 12 occurs at the interface between the bushing and the boss. If desired, the washer 34 may be coupled to the bolt 36 through the intermediation of a suitable bearing means, e.g., a Teflon washer (not shown), so that the washer 34 remains stationary with respect to the boss 18 and bolt 36 during table operation.

Again referring to FIGS. 1 and 2, the bearing surface intermediate the base 12 and the underside of the table 16 adjacent marginal or peripheral edges thereof is provided by an annular Teflon track 28. This Teflon track 28 may be formed from a sheet of Teflon having a thickness of about 0.02 of an inch which is sufficient to provide an adequate bearing surface between the base and the table. The effective width of the track, i.e., the portion of the track intermediate the inner and outer diameters of the track that is in contact with the table, should present a surface area sufficient to support the weight of a loaded table without affecting or otherwise detracting from the bearing properties afforded by the Teflon. For example, in a 16-inch rotary table, a track 28 having an effective width of about 1.25 inches has been found to be satisfactory. The track 28 may be secured to the base in any suitable manner such as, for example, the bolting arrangement shown at 40.

While the novel Teflon bearing construction utilizing the "isostatic effect" has been described for use in rotary tables, it is to be understood that this novel bearing may be used in other types of machines, drive trains, or in nearly any location where conventional bearings such as bushings and ball bearings are presently employed.

It will be seen that the present invention sets forth a novel bearing system for use between relatively movable elements whereby rotational runout is for all practical purposes non-existent or virtually eliminated in a highly economical manner. For example, rotational runout on a rotary table employing the novel bearing is only about 0.000010 to about 0.000020 of an inch which compares very favorably to rotary tables utilizing highly precise and expensive roller bearings. Another illustration of the novelty and usefulness of the present invention is that a badly worn and corroded, inexpensive, commercially available rotary table having rotational runout of about 0.006 of an inch when new was modified to incorporate the bearing construction of the present invention. After completing the modification the rotational runout was reduced to about 0.000030–0.000035 of an inch. Even a greater reduction in runout would have been realized if the rotary table had been in a better state of repair prior to the modification. Further, since the bushing and track are resilient, they do not take on a permanent set as the result of uneven loading or blows to the table.

I claim:

1. In combination, a housing having an aperture therein defined by substantially uniformly converging wall portions of said housing, an elongate element having a surface of revolution disposed in said aperture at a location radially spaced from said wall portions, bearing means consisting of a tubulation of polytetrafluoroethylene disposed in said aperture in a contacting relationship with said wall portions and said element and enveloping an elongate portion of said element for supporting the latter for rotation about an axis, said bearing means being characterized by having a cross section of substantially uniformly varying thickness throughout the length thereof for conforming with the configuration of said aperture with the thickness of said bearing means being of a sufficient mass to provide an isostatic coupling, when sufficiently stressed, with the enveloped portion of said element for causing the tubulation to bear against the element with a force equally distributed about the entire periphery and enveloped length of the element, and means engaging an end surface of the tubulation and movable in a direction parallel to said axis for selectively stressing the tubulation to effect said isostatic coupling.

2. In combination, an elongate element having a surface of revolution, bearing means encompassing a portion of the element for rotatably supporting the element about an axis and comprising an elongate tubulation of polytetrafluorethylene contacting with a uniform pressure the surface of essentially the entire encompassed portion of the elongate element, a supporting element carrying the elongate element and the tubulation with wall portions of the supporting element being disposed about and contacting peripheral surfaces of the tubulation for supporting the latter, said wall portions being at least coextensive with the tubulation for inhibiting lateral movement of the tubulation in a direction perpendicular to said axis and being separated from the elongate element in a substantially uniformly varying manner throughout at least a substantial length of the wall portions, the peripheral surfaces of the tubulation are at least substantially parallel with said wall portions, a further element contacting an end surface of the tubulation adjacent to a location on the peripheral surfaces thereof corresponding to the greatest separation between the peripheral surfaces and the elongate element and movable in a direction parallel to said axis for selectively stressing the tubulation to effect the uniform pressure contact between the tubulation and the elongate element, said supporting element having an annular surface coaxial with and laterally separated from the elongate element, a discoid member affixed to said elongate element and disposed in close contiguity to the annular surface on said supporting element, and further bearing means disposed intermediate the annular surface on the supporting element and peripheral portions of the discoid member, said further bearing means comprising an annulus of polytetrafluorethylene secured to and carried by said supporting element.

References Cited

UNITED STATES PATENTS

| 2,773,725 | 12/1956 | Roberts. |
| 2,778,664 | 1/1957 | Herbenar _____ 308—238 X |
| 2,906,573 | 9/1959 | Runton _____ 308—238 |
| 2,892,662 | 6/1959 | Scheel _____ 308—238 X |
| 3,009,747 | 11/1961 | Pitzer _____ 308—71 |
| 3,031,202 | 4/1962 | Melton et al. |
| 3,133,769 | 5/1964 | Drake _____ 308—238 X |
| 3,253,136 | 5/1966 | Faul _____ 287—52.06 X |

FOREIGN PATENTS 850,756 10/1960 Great Britain.

CARROLL B. DORITY, JR., *Primary Examiner.*

U.S. Cl. X.R.

308—238, 163, 157